(12) United States Patent
Jackson et al.

(10) Patent No.: US 8,655,389 B1
(45) Date of Patent: Feb. 18, 2014

(54) METHOD AND SYSTEM FOR ENABLING A USER TO OBFUSCATE LOCATION COORDINATES BY GENERATING A BLUR LEVEL, AND APPLYING IT TO THE LOCATION COORDINATES IN A WIRELESS COMMUNICATION NETWORKS

(75) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/572,525

(22) Filed: Aug. 10, 2012

(51) Int. Cl.
*H04W 24/00* (2009.01)

(52) U.S. Cl.
USPC ............ 455/457; 455/414.2; 455/414.1; 455/418; 455/420; 455/456.1; 455/456.3; 455/550.1; 455/556.2

(58) Field of Classification Search
USPC ............ 455/404.1–404.2, 414.1, 418–420, 455/456.3, 550.1, 556.2, 422.1, 456.1, 457; 701/408–418; 709/205, 223
See application file for complete search history.

(56) References Cited

U.S. PATENT DOCUMENTS

| | | | |
|---|---|---|---|
| 2007/0178909 | A1 | 8/2007 | Doyle |
| 2009/0047972 | A1 | 2/2009 | Neeraj |
| 2009/0177374 | A1* | 7/2009 | Liu ............................. 701/200 |
| 2010/0077484 | A1 | 3/2010 | Paretti et al. |
| 2010/0234046 | A1* | 9/2010 | Wood ........................ 455/456.3 |

* cited by examiner

*Primary Examiner* — Vladimir Magloire
*Assistant Examiner* — Babar Sarwar
(74) *Attorney, Agent, or Firm* — McDermott Will & Emery LLP

(57) ABSTRACT

Systems, methods, and machine-readable media for blurring location information for an entity. The system may be configured to receive a location display setting comprising a condition and a blur level to apply to location coordinates, receive location coordinates for an entity, determine whether the condition is satisfied based on the location coordinates, and, if the condition is satisfied, report location information for the entity in a mapping interface based on the location coordinates for the entity and the blur level.

20 Claims, 6 Drawing Sheets

Add a Location Blur Setting

210 — Blur Level: [ 100 Meters ▼ ]

Condition(s):

- ◉ While Driving
- ○ At "Home" location
- ◉ At "Work" location
- ○ In Public locations
- ○ In Locations Previously Checked-In to
- ○ Other Locations:
  (select from the list or input a new location) [ ▼ ]
- ○ Other Condition (please list) [          ]

Blurred Location Visible to: [ Friends ▼ ]

(select from the list or input new entity)

[ Submit ]

METHOD AND SYSTEM FOR ENABLING A USER TO OBFUSCATE LOCATION COORDINATES BY GENERATING A BLUR LEVEL, AND APPLYING IT TO THE LOCATION COORDINATES IN A WIRELESS COMMUNICATION NETWORKS

FIELD

The present disclosure generally relates to location-based services and, in particular, to a user sharing the user's location information with other users.

BACKGROUND

Location-aware devices capable of tracking a user's location (e.g., GPS devices, smart phones, or other tracking devices) are becoming increasingly common and are being used for an increasing number of location-based services. For example, the location-aware devices may be configured to determine their current location coordinates and use the location coordinates for a number of applications such as finding a route from one point to another.

Other applications may involve users or other entities sharing their location with others. For example, a user may wish to share his location with a group of friends or family members or a Mass Transit Authority may wish to keep track of their fleet of buses. To enable location sharing, a location-aware device associated with an entity (e.g., a user or a bus in the fleet) may be configured to transmit location coordinates of the location-aware device to one or more servers. The location coordinates may be transmitted in order to share the entity's current location with the public or a specific group of people (e.g., friends or the Mass Transit Authority).

SUMMARY

Various aspects of the subject technology relate to a system for blurring location information for an entity. The system may include one or more processors and a machine-readable medium comprising instructions stored therein, which when executed by the one or more processors, cause the one or more processors to perform operations. The operations may include accessing a location display setting comprising a blur level and a condition in which to apply the blur level, wherein the blur level is a measurement of a level of obscurity with which to report location coordinates, receiving location coordinates for an entity, determining whether the condition is satisfied, and reporting, if the condition is satisfied, location information for the entity in a mapping interface based on the location coordinates for the entity with the applied blur level.

Various aspects of the subject technology relate to a computer-implemented method for blurring location information for an entity. The method may include receiving a location display setting comprising a blur level and a condition in which to apply the blur level, wherein the blur level is a measurement of a level of obscurity with which to report location coordinates, receiving location coordinates for an entity, determining whether the condition is satisfied based on the location coordinates, and reporting, if the condition is satisfied, location information for the entity in a mapping interface based on the location coordinates for the entity with the applied blur level.

Various aspects of the subject technology relate to a machine-readable medium including instructions stored therein, which when executed by a machine, cause the machine to perform operations for blurring location information for an entity. The operations may include receiving location coordinates for a user, determining whether a condition associated with a blur setting is satisfied, wherein the blur level is a measurement of a level of obscurity with which to report location information for the user, and reporting, if the condition is satisfied, location information for the user in a mapping interface based on the location coordinates for the user and the blur level in the location display setting.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 2 is an example user interface that a user may use to indicate a blur level and conditions in which to apply the blur level to the user's location coordinates, in accordance with one aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Certain location-based services may be configured to share the location of entities (e.g., users, delivery trucks, planes, etc.) with others. However, not all users may wish to share their location with the public at all times, especially when they are in locations with a higher expectation of privacy (e.g., when a user is at home). In other cases, users may not wish to share their exact location in certain situations, but may be willing to share a general area (e.g., an area a kilometer across, a city block, a city, etc.) that they are in.

According to various aspects of the subject technology, a system may be configured to enable an entity (e.g., a user) to obscure or blur the entity's location coordinates when it is being reported to others. Blurring (or fuzzing) a location may be an intentional introduction of inaccuracies into the location information and/or direction for an entity or intentionally obfuscating the location information of an entity by generalizing a precise location to a larger area or radius of uncertainty.

The system may allow the entity or an administrator to select a blur level (e.g., a level of detail or granularity) and indicate a condition or scenario in which the selected blur level should be applied to the location coordinates. After one or more blur levels and conditions have been defined for a user, the system may monitor the user and detect whether or not one of the conditions is satisfied. If a condition is satisfied, the system may cause the location coordinates for the entity to be reported to others in accordance with the blur level associated with that condition.

Figure 1:
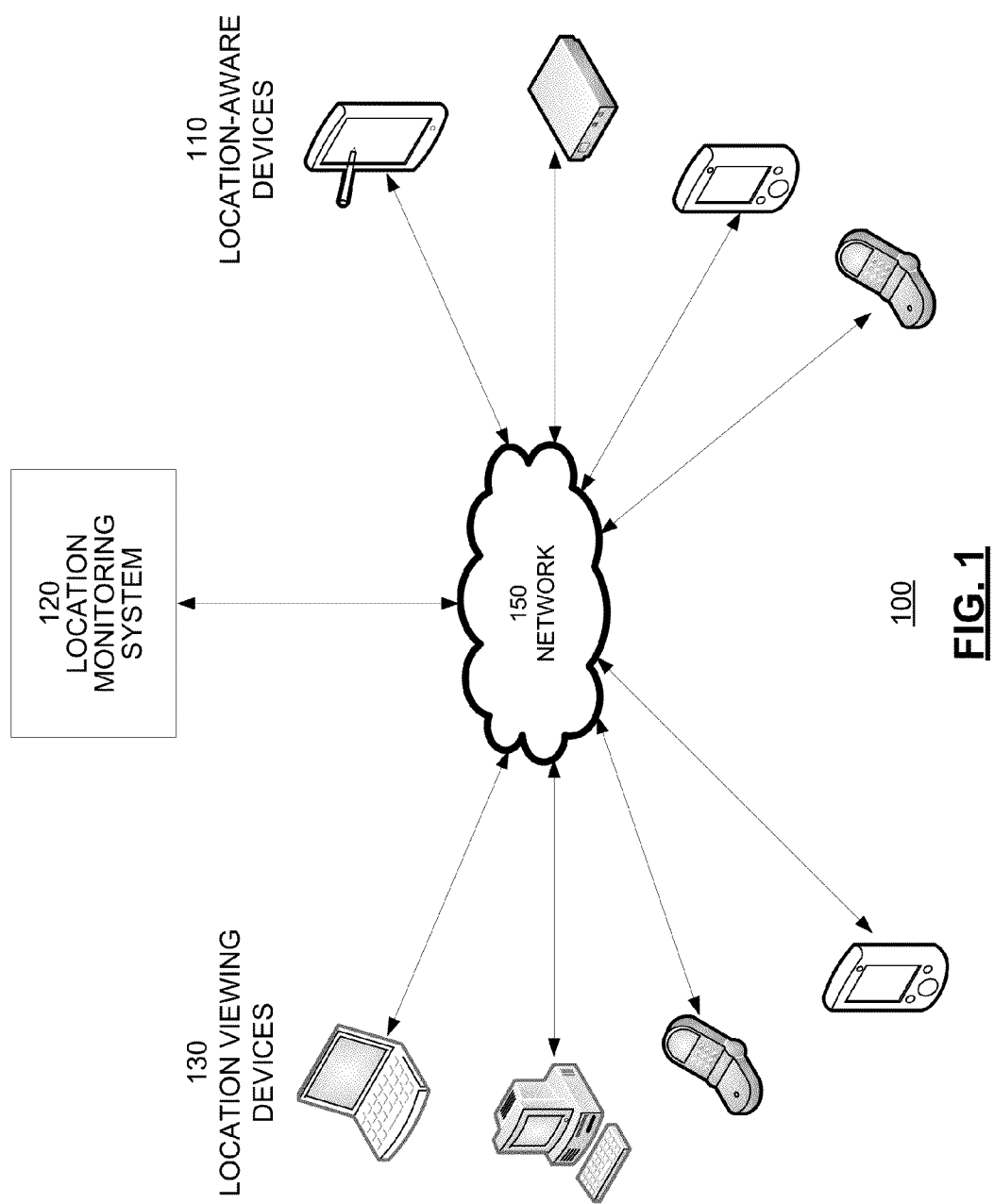
FIG. 1 is a block diagram illustrating an example network environment in which a location-based service may blur the location coordinates for an entity, in accordance with one aspect of the subject technology.

FIG. 1 is a block diagram illustrating an example network environment 100 in which a location-based service may blur the location coordinates for an entity (e.g., a user), in accordance with one aspect of the subject technology. The network environment 100 includes one or more location-aware devices 110, one or more location viewing devices 130, and one or more servers hosting a location monitoring system 120 all connected over a network 150 such as the Internet. Although FIG. 1 illustrates the network environment 100 in a client-server configuration, other aspects of the subject technology may include other configurations.

The location-aware devices 110 and location viewing devices 130 may include, for example, mobile devices (e.g., a smart phone or a global positioning system (GPS) device), computers (e.g., mobile computers, tablet computers, laptop computers), or any other machine capable of communicating with the location monitoring system 120. The location-aware devices 110 may be configured to determine their location (e.g., location coordinates obtained using GPS technology) and report their location coordinates to the location monitoring system 120.

The location monitoring system 120 may receive the location coordinates associated with an entity (e.g., a user) that were reported by a location-aware device 110 and use the location coordinates to provide location-based services. For example, the location monitoring system 120 may use the location coordinates associated with a user to share the location of the user with others. In some cases the user may identify the users, groups, or other entities that are authorized to view the user's location.

The location monitoring system 120 may receive requests for a user's location from location viewing devices 130 or from an entity attempting to access the user's location at the location monitoring system 120 itself. The location monitoring system 120 may verify that the entities associated with the location viewing devices 130 or the entities attempting to access the user's location are authorized to view the user's location and, if the entities are authorized, the location monitoring system 120 may share the user's location with the authorized entities.

According to one aspect, the location monitoring system 120 may allow a user to indicate a blur level that will be used to report the user's location information. The user may also indicate the conditions under which the blur level is to be used. In one sense, a blur level may be considered a level of obscurity that may be applied to the location coordinates of a user that may obscure the user's exact location. In another sense, the blur level may be considered a level of detail with which the user's location information will be reported.

For example, a user may be willing to share the more accurate location information to one group of people (e.g., the public, co-workers, etc.) when the user is out in public. The same user, however, may be unwilling to share his exact location (e.g., the location coordinates reported by the user's location-aware device) with the group of people when the user is at home or at some other location where the user has a heightened desire for privacy. Perhaps the user does not wish the group of people to know the exact location of his home. Accordingly, the user may be able to set a blur level at their "home" location to be a higher blur level (e.g., the location information for the user will be more obscure or reported in less detail) than the user's default blur level.

In another aspect, the user may be willing to share more accurate location information with one group of people (e.g., friends, family, wife, etc.) than another group of people (e.g., co-workers or the public). Accordingly, the user may be able to set a blur level for a "friends" or "family" group at a lower level (e.g., the location information for the user will be more accurate or reported in more detail) than the blur level for a "co-workers" group.

FIG. 2 is an example user interface 200 that a user may use to indicate a blur level and conditions in which to apply the blur level to the user's location coordinates, in accordance with one aspect of the subject technology. The user may access the user interface 200 on, for example, the user's location-aware device 110 and select a blur level 210 and conditions in which to apply the blur level 210.

Figure 3:
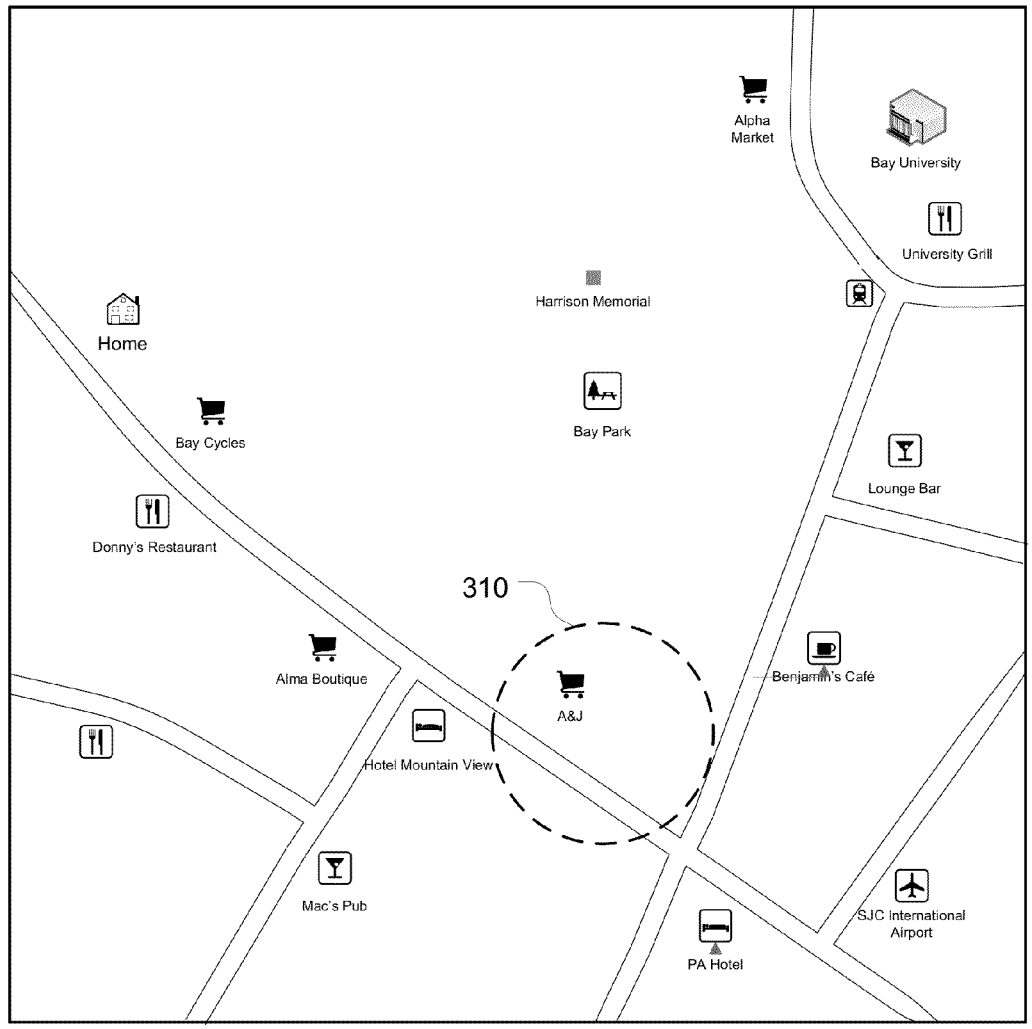
FIG. 3 is diagram illustrating an example mapping interface, in accordance with one aspect of the subject technology.

The blur level 210 may be, for example, a measurement of the accuracy with which to report the user's location coordinates. For example, FIG. 3 is diagram illustrating an example mapping interface 300, in accordance with one aspect of the subject technology. FIG. 3, shows a blurred location 310 of the user on the mapping interface 300 that may be displayed on a viewing entity's location viewing device 130. As a result, the viewing entity on the location viewing device 130 may know the geographic area (corresponding to the blurred location 310) that the user is in, but not the exact location coordinates reported by the user's location-aware device 110.

According to one aspect of the subject technology, the blur location 310 may be shown on the mapping interface 300 as off-centered from the actual location coordinates of the user to make it more difficult for a viewing entity to determine a more accurate location for the user.

Referring back to FIG. 2, the blur level 210 options may be a measurement of the radius, diameter, or area of the blurred location 310 visible to a viewing entity in the mapping interface 300. Some example blurring levels may include the location coordinates reported by the user's location-aware device (e.g., no blurring), 50 feet, 100 meters, 1 kilometer, 3 miles, etc. According to another aspect, however, the blur level 210 may be any other geographic unit or defined area type that may be applied to the user's location coordinates and displayed as a blurred location 310 on a mapping interface 300. Example defined area types may include, for example, one or more city blocks, a neighborhood, a city, a zip code, etc.

As discussed above, in some aspects, the user may also indicate the conditions in which to apply the blur level 210. For example, the user may indicate that the selected blur level 210 is to be applied at certain locations. These locations may include stored locations from an address book associated with the user, locations that the user has labeled (e.g., "Home" and "Work"), locations that the user is associated with (e.g., locations the user has previously checked-in to), or categories of locations (e.g., restaurants, retail stores, public places, private places, etc.) that may be identified by the location monitoring system 120.

For example, the user may indicate a particular blur level for public locations and another blur level for private locations. The location monitoring system 120 may determine if a user is in a public or private space in a variety of ways. For example, the location monitoring system may access a point of interest (POI) database containing information about a number of points of interest. The information may include the location of a point of interest, categories associated with the point of interest, and whether the point of interest is a public space (e.g., a stadium or concert hall) or a private space (e.g., a residence).

Using the POI database, the location monitoring system 120 may determine automatically if the user is at a point of interest and whether the point of interest is public or private and apply the blur level accordingly. The POI database may be similarly used to determine automatically whether a blur level should be applied for other categories of locations.

In another aspect, the system may determine whether a location is public or private based on the population density of a location. If the current population density of an area, based on the entities being monitored by the location monitoring system 120, is above a threshold level, the location may currently be considered a public place. Otherwise, the location may be a private place. Once the determination is made, according to one aspect, the system may inform the user that the location monitoring system 120 has determined that the location the user is at is public or private and the user may have an opportunity to override the determination if the user disagrees.

According to another aspect of the subject technology, the user may be able to set a blur level 210 for when the user is moving or in transit (e.g., driving). The location monitoring system 120 may determine whether the user is moving by comparing a number of the user's most recently reported location coordinates. If the location coordinates show a change in location over a given period of time, the user may be considered to be moving.

When the user is determined to be moving, the location monitoring system 120 may report the user's location using the blur level 210 selected by the user. In one aspect, if the blur level for a moving user is low (e.g., more accurate), the reporting of the user's location may be delayed for a period of time (e.g., 2 or 5 minutes) when the user is moving so that an entity monitoring the user's location will not know exactly where the user is or where the user stops. In another aspect, the system may continue to report the location of the user as moving for a time or distance after the user has stopped in order to obfuscate where the user has stopped. The amount of time, distance, or direction that the user may reported as moving after the user has stopped may be randomly determined or a predetermined amount.

The user may also be able to associated the selected blur level 210 with all viewing entities (e.g., a default blur level) or a particular group of viewing entities. For example, the use may identify members of a "Family" group and assign a blur level to the "Family" group (e.g., a high level of detail). The user may also identify members of a "Friends" group and assign another blur level to that group (e.g., a lower level of detail). The location monitoring system 120 may monitor which entities are viewing the location of the user or requesting the user's location information, blur the location coordinates of the user based on the blur level associated with the viewing entities, and provide the blurred location information for the user to the viewing entities.

The user may indicate, on the user interface 200, a blur level and the conditions in which the blur level should be applied. Once the conditions and the blur level are indicated, a location display setting that includes the blur level and the conditions may be generated and transmitted to a location monitoring system where it may be used to report the user's location to others. One such system is shown in FIG. 4.

Figure 4:
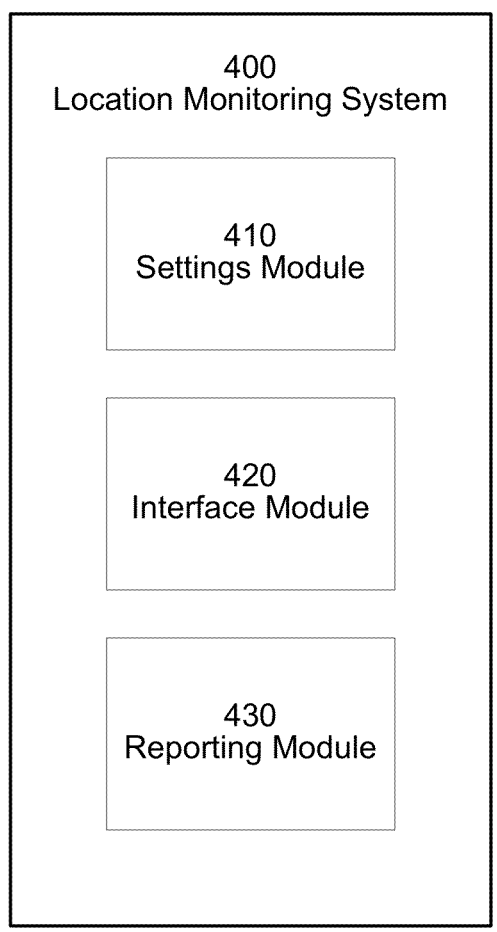
FIG. 4 is a conceptual block diagram illustrating an example location monitoring system, in accordance with one aspect of the subject technology.

FIG. 4 is a conceptual block diagram illustrating an example location monitoring system 400, in accordance with one aspect of the subject technology. The location monitoring system 400 may include a settings module 410, an interface module 420, and a reporting module 430. While the system 400 is shown in one configuration in FIG. 4, in other configurations, the system 400 may include additional, alternative, and/or fewer components.

The location monitoring system 400 may be configured to report a user's location according a specified blur level. For example, the settings module 410 may be configured to receive location display settings from a user (e.g., from the user's location-aware device 110 in FIG. 1) and store the location display settings for the user. The location display settings may include, for example, whether or not the user wishes to share the user's location, a default blur level, and additional blur levels associated to apply under certain conditions (e.g., depending on the user's location and the viewing entity).

The interface module 420 may be configured to receive location coordinates for a user from the user's location-aware device 110. According to one aspect, the location coordinates may be Global Positioning System (GPS) coordinates. However, one or more other technologies may be used in addition to or instead of GPS to determine location coordinates representing the user's location. For example, location information may be obtained by identifying one or more cell towers that a mobile device may detect or detecting one or more wireless networks with known locations within range of the mobile device. Thus, it should be understood that location coordinates can be used to report location information for a user as discussed herein regardless of the technology or technologies used to determine the location coordinates.

Using the location coordinates, the reporting module 430 may determine if one or more conditions described in the location display settings are fulfilled. If a condition is fulfilled, the reporting module 430 may report location information for the user according to the location coordinates of the user and the blur level associated with the fulfilled condition.

Figure 5:
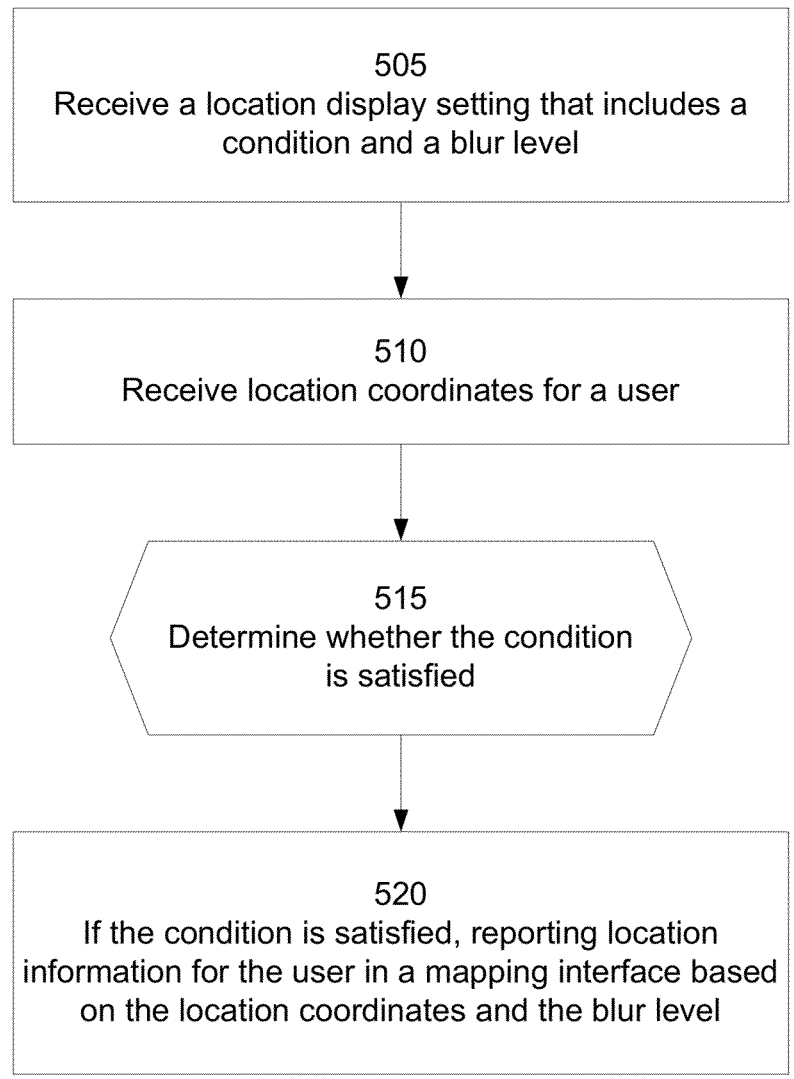
FIG. 5 is a flow chart illustrating an example process for reporting location information according to a location display setting, in accordance with various aspects of the subject technology.

FIG. 5 is a flow chart illustrating an example process 500 for reporting location information according to a location display setting, in accordance with various aspects of the subject technology. Although the steps in FIG. 5 are discussed with respect to the components of system 400 illustrated in FIG. 4, the steps are not limited to these modules. Furthermore, although the steps are shown in one particular order, additional steps, fewer steps, or other orderings of the steps are also possible.

At step 505, the settings module 410 may receive a location display setting that includes a condition and a blur level. According to one aspect, the settings module 410 may receive a location display setting for a user generated using the user interface 200 in FIG. 2 and store the location display setting in a database. The location display setting may be used to determine whether to share the user's location with another entity and, if so, what blur level should be applied.

For example, at step 510, the interface module 420 may receive one or more location coordinates for the user. In order to determine whether the user's location should be shared and how to share the user's location, at step 515, the reporting module 430 may automatically determine if a condition in one of the location display settings stored by the settings module 410 is satisfied. If a condition is satisfied, at step 520, the reporting module 430 may report location information for the user in a mapping interface based on the location coordinates and the blur level associated with the satisfied condition.

A condition in a location display setting may include, but is not limited to, a viewing entity, the user's location coordinates being at or near (e.g., within a threshold distance of) a location or a set of locations, the user's location coordinates being at or near a category of location (e.g., public places, restaurants, locations the user has checked-in to, etc.), the user being in transit, or a combination of these. Another example location display setting may include a blur level for a condition the user is at a particular location for a threshold time period (e.g., 10 minutes).

Although in many aspects discussed above, location display settings may be set by a user using, for example, the user interface 200 in FIG. 2, according to some aspects of the subject technology, the location display settings may also be set by a location monitoring system administrator or an administrator associated with a point of interest. For example, the administrator of a point of interest (e.g., the owner of a restaurant) may use an interface similar to user interface 200 to set a blur level for the administrator's point of interest (e.g., the restaurant). This blur level, however, may be overridden by a user's location display settings.

According to some aspects of the subject technology, if a user visits a location a number of times, the location monitoring system may associate a blur location with the location and store the blur location for future use when the user visits the location again. Accordingly, multiple visits to a location will not negate the location blur and it will be more difficult for a viewing entity to determine the precise location of the user when the user makes multiple visits to the location.

In one aspect, a default blur level of "no blur" (e.g., displaying the most accurate location information or location coordinates available) may be set for high-risk areas (e.g., the open seas or in a national park) where there are few drawbacks to sharing a user's exact location.

According to one aspect, regardless of how location data is obtained, appropriate efforts may also be taken to protect privacy rights of the entities. For example, collection of location data may be on an opt-in basis so that data is not collected unless the entity has granted permission, with the location data stored and handled in a secure manner. Additionally, steps can be taken to anonymize the location data (e.g., to ensure that the location data cannot be tied to a particular entity and/or to a particular device).

Figure 6:
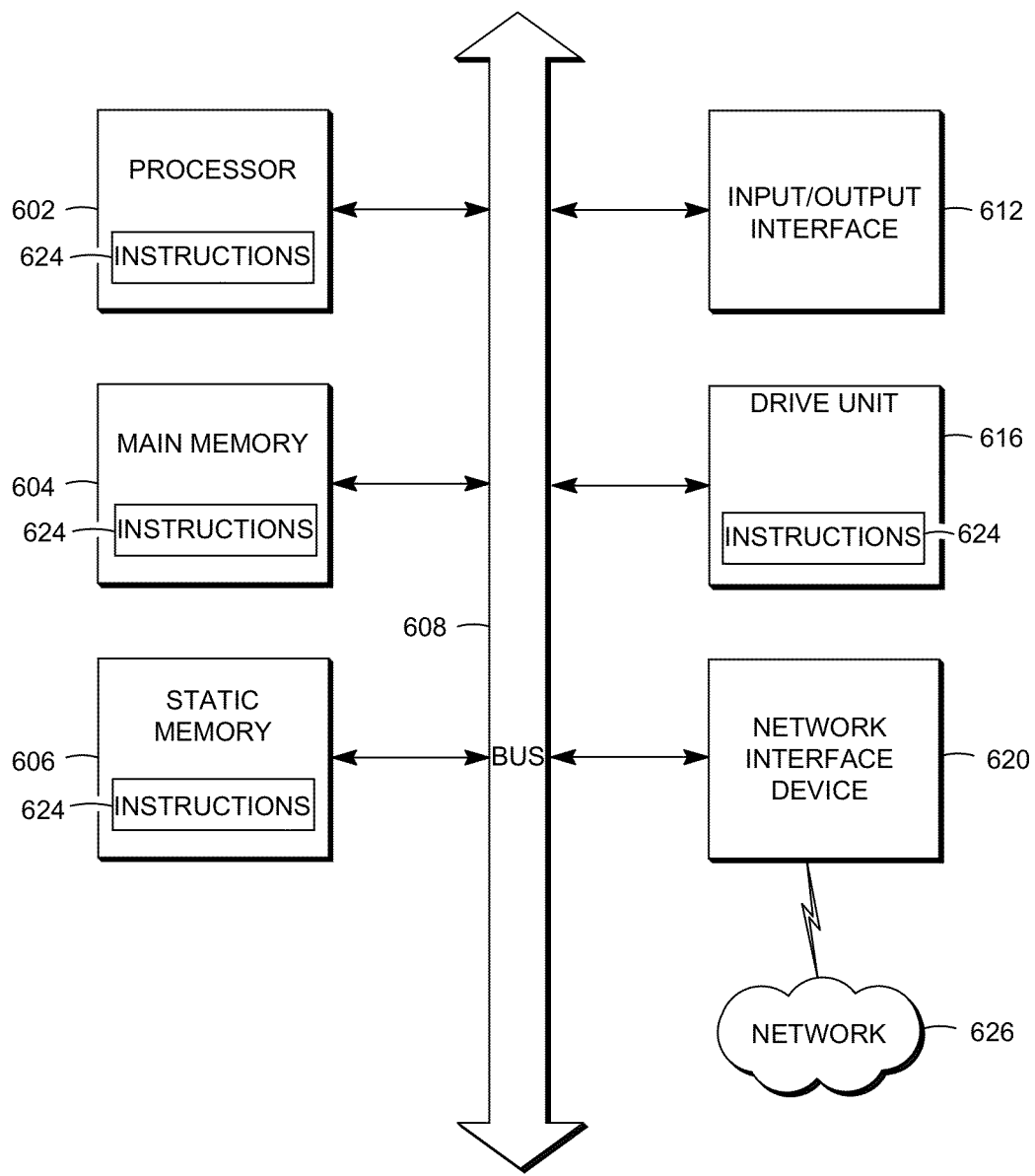
FIG. 6 is a block diagram illustrating an example computer system with which any of the devices or systems described herein may be implemented.

FIG. 6 is a block diagram illustrating an example computer system 600 with which any of the devices or systems described herein may be implemented. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may comprise the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for blurring location information for an entity. The system may be configured to receive a location display setting comprising a condition and a blur level, receive location coordinates for an entity, determine whether the condition is satisfied based on the location coordinates, and, if the condition is satisfied, report location information for the entity in a mapping interface based on the location coordinates for the entity and the blur level.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method configured for blurring location information for a first user, the method comprising:

receiving a location display setting comprising a blur level and a condition in which to apply the blur level, wherein the condition comprises a viewing party and wherein the blur level is a measurement of a level of obscurity with which to report location coordinates of the first user;

receiving the location coordinates for the first user;

receiving, from a second user, a request for the location coordinates of the first user;

determining whether the condition is satisfied based on the location coordinates and whether the second user corresponds to the viewing party; and reporting, to the second user, when the condition is satisfied, location information for the first user to the second user in a mapping interface based on the location coordinates for the first user with the blur level.

2. The computer-implemented method of claim 1, wherein the condition further comprises the location coordinates for the first user being at a particular geographic location.

3. The computer-implemented method of claim 1, wherein the condition further comprises the location coordinates for the first user being at a particular geographic location for a threshold time period.

4. The computer-implemented method of claim 1, wherein the condition further comprises the location coordinates for the first user being at a geographic location that corresponds to a location category.

5. The computer-implemented method of claim 4, wherein the location category comprises a public location.

6. The computer-implemented method of claim 4, wherein the location category comprises a private location.

7. The computer-implemented method of claim 1, wherein the condition further comprises the first user being in transit.

8. The computer-implemented method of claim 1, wherein the location display setting for the user is set by the first user.

9. The computer-implemented method of claim 1, wherein the location coordinates are Global Positioning System (GPS) coordinates.

10. The computer-implemented method of claim 1, wherein the blur level is a radius value.

11. The computer-implemented method of claim 1, wherein the blur level is a defined area type.

12. The computer-implemented method of claim 1, wherein the blur level is a geographic area value.

13. A system configured for monitoring locations for blurring location information for a first user, the system comprising:

one or more processors; and a non-transitory machine-readable medium comprising instructions stored therein, which when executed by the one or more processors, cause the one or more processors to perform operations comprising:

accessing a location display setting comprising a blur level and a condition in which to apply the blur level, wherein the condition comprises a viewing party and wherein the blur level is a measurement of a level of obscurity with which to report location coordinates of the first user, receiving the location coordinates for the first user, receiving, from a second user, a request for the location coordinates of the first user;

determining whether the condition is satisfied based on whether the second user corresponds to the viewing party, and reporting, to the second user, when the condition is satisfied, location information for the first user in a mapping interface based on the location coordinates for the first user with the blur level.

14. The system of claim 13, wherein the condition further comprises the location coordinates for the first user being at a particular geographic location.

15. The system of claim 13, wherein the condition further comprises the location coordinates for the first user being at a geographic location that corresponds to a location category.

16. The system of claim 15, wherein the location category comprises a public location.

17. The system of claim 13, wherein the location display setting for the first user is set by an administrator of a point of interest.

18. The system of claim 13, wherein the location display setting is associated with the first user.

19. A non-transitory machine-readable medium comprising instructions stored therein, which when executed by a machine, cause the machine to perform operations comprising:
- receiving location coordinates for a first user;
- receiving a condition associated with a blur level, wherein the condition comprises a viewing party and wherein the blur level is a measurement of a level of obscurity with which to report location information for the first user;
- receiving, from a second user, a request for the location coordinates of the first user;
- determining whether the condition associated with blur level is satisfied based on whether the second user corresponds to the viewing party; and
- reporting, to the second user, when the condition is satisfied, location information for the first user in a mapping interface based on the location coordinates for the first user and the blur level associated with the condition.

20. The non-transitory machine-readable medium of claim 19, wherein the location coordinates are received from a location-aware device associated with the first user.

\* \* \* \* \*